Aug. 9, 1932.  C. E. CARPENTER  1,871,112
MOTOR CONTROL SYSTEM
Original Filed Aug. 11, 1924  3 Sheets-Sheet 1

Fig. 1.

INVENTOR
Charles E. Carpenter
BY
Frank H. Hubbard
ATTORNEY

INVENTOR
Charles E. Carpenter
BY
Frank H Hubbard
ATTORNEY

Aug. 9, 1932.   C. E. CARPENTER   1,871,112
MOTOR CONTROL SYSTEM
Original Filed Aug. 11, 1924   3 Sheets-Sheet 3

INVENTOR
Charles E. Carpenter
BY
Frank H. Hubbard
ATTORNEY

Patented Aug. 9, 1932

1,871,112

UNITED STATES PATENT OFFICE

CHARLES E. CARPENTER, OF HOPEWELL JUNCTION, NEW YORK

MOTOR CONTROL SYSTEM

Application filed August 11, 1924, Serial No. 731,282. Renewed July 25, 1931.

This invention relates to an electric motor controller.

The invention has as an object to provide a controller switch which will operate at a predetermined speed in starting the motor and which will then remain operated to a lower speed or until the motor stops.

Another object is to provide a switch which will have a positive and definite action and which will operate to open or close at a definite predetermined speed.

Another object is to provide a switch which is simple and efficient and which may be readily and economically manufactured.

Another object is to provide a switch which is operated from the motor by a positive and definite action.

Other objects will appear from the switch and apparatus which is hereinafter set forth.

According to the invention, as it has been employed in practice, a fluid pressure pump is operated in accordance with the motor speed, a fluid motor is operated by fluid pressure from said pump, a switch is operated by said fluid motor, and a throttle valve or other means controls the pressure maintained by said pump.

The switch is employed to control means for causing the motor to have a reverse torque while it is being stopped, and in addition it may be employed to control means to start and operate the motor.

The throttle valve is operated by the pressure at a predetermined speed to cause the pressure to increase and operate the valve, and further it maintains this increased pressure until the motor operates below such predetermined speed or is about to stop.

Accordingly, the switch will remain operated and cause the motor to have a reverse torque until it is about to stop.

A controller which embodies the invention and an alternating current motor control system in which such switch may be employed are illustrated in the accompanying drawings, in which.

Like reference characters designate like parts in the several figures.

Figure 1:
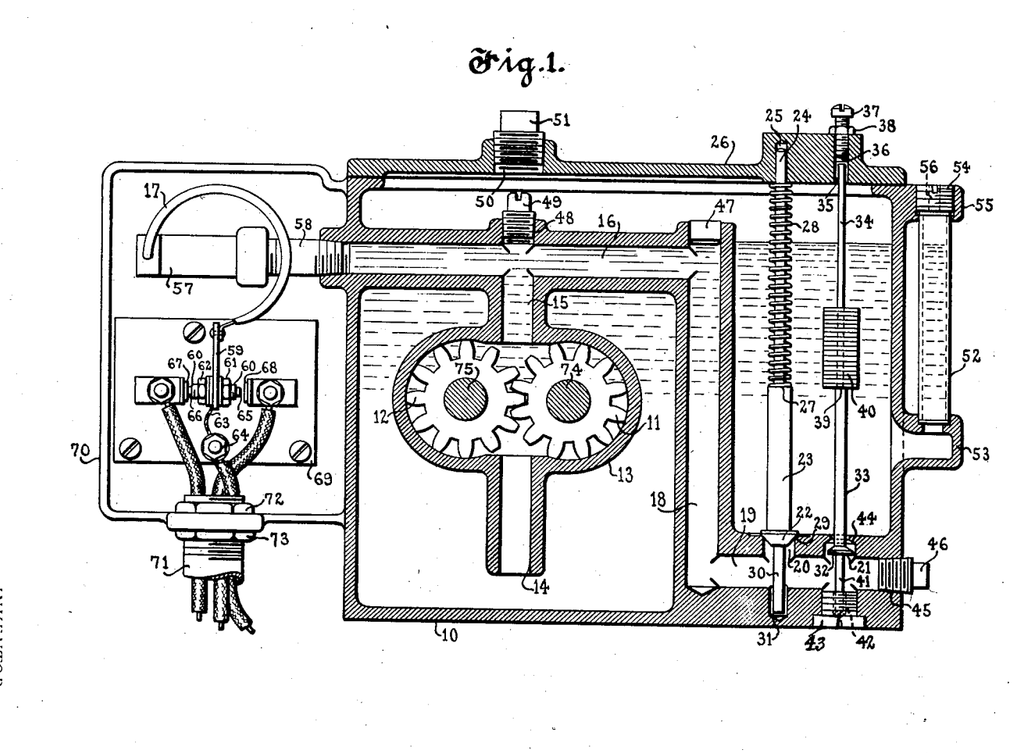
Figure 1 is a vertical sectional view of the fluid circulating system, including the pressure responsive switch controlled thereby.

In the drawings the numeral 10 designates a casting or other suitable receptacle adapted to house a positive displacement fluid pump, preferably of the gear type having gears 11 and 12 meshing with each other. The pump chamber 13 is provided with an inlet nozzle 14 and a discharge conduit 15, and as shown in Fig. 1 the conduit 15 communicates with a conduit 16 leading toward the left to the Bourdon tube 17 or other suitable pressure responsive means, said conduit 16 also communicating at the right with conduits 18 and 19. Conduit 19 is provided with openings 20 and 21 leading to the interior of receptacle 10, the opening 20 being normally closed by a relief valve 22 having a valve stem 23 with a reduced portion 24 extending upwardly into a guide-way 25 in the removable cover 26 of receptacle 10. Interposed between the under side of cover 26 and a shoulder 27 on the valve stem 23 is a coiled spring 28, which forces valve 22 downwardly onto its seat 29. Extending downwardly from valve 22 is a guide rod 30 adapted to enter a guide-way 31 in the lower portion of receptacle 10.

Within the opening 21 is a check valve 32 having a stem 33 with a reduced portion 34 extending upwardly into a guide-way 35 in the cover 26. Said guide-way is screw threaded as indicated at 36 to receive an adjustable screw 37 to limit the upward or closing movement of valve 32. A lock-nut 38 is provided for maintaining screw 37 in the desired position. Strung upon the reduced portion 34 of the valve stem and resting upon a shoulder 39 thereof are a plurality of removable weights or disks 40 to maintain said valve in open position pending development of predetermined pressure conditions in conduit 19, as hereinafter more fully described. Extending downwardly from valve 32 is a guide rod 41 adapted to enter a suitable guide-way 42 at the inner end of a counter-sunk screw 43 in the bottom of receptacle 10. Screw 43 also serves to plug the hole drilled to form the opening 21 and valve seat 44.

Conduit 19 is similarly formed by drilling from the outside of casting or receptacle 10, said conduit being tapped at 45 to receive a screw plug 46, or, as hereinafter described, a union may be substituted for plug 46 for subjecting auxiliary devices to control in accordance with pressure conditions in conduit 19. After drilling conduit 18, the cover 26 of receptacle 10 being removed, the upper end thereof is closed by a suitable permanent plug 47, conduit 16 being drilled to intersect said conduit below the plug 47. The opening 48, in alinement with conduit 15 and inlet nozzle 14, is provided with a removable screw plug 49 for a purpose hereinafter described.

Cover 26 is provided with a filling opening 50 which is threaded to receive a removable screw plug 51. A gage glass 52 indicates the level of liquid within receptacle 10, said gage being supported between a perforated hollow boss or lug 53 and a cap 54 which has screw threaded engagement with a lug or projection 55. Cap 54 is provided with a vent 56.

The Bourdon tube 17 is connected at one end with a hollow member 57, said member being suitably connected to nipple 58 through which it communicates with conduit 16. Riveted or otherwise suitably secured to the free end of Bourdon tube 17 is a block or strip 59 of insulation, which supports a threaded stud 60, held in position by nuts 61 and 62 and electrically connected by flexible connection 63 with terminal 64. Stud 60 is provided with contact points 65 and 66, said stud being normally adapted to engage stationary contact terminal 67, whereas upon development of predetermined pressure conditions within tube 17 said stud is moved out of engagement with contact terminal 67 and into engagement with contact terminal 68. Contact terminals 64, 67 and 68 are attached to an insulating panel 69, which is supported by a suitable housing or protective casing 70, the latter being secured in any suitable manner to the receptacle 10. Casing 70 is provided with a suitable opening to receive a wire conduit 71, said conduit being locked in position by nuts 72 and 73. A removable front cover plate, not shown, may be provided for casing 70 to permit ready access to the interior thereof.

Figure 2:
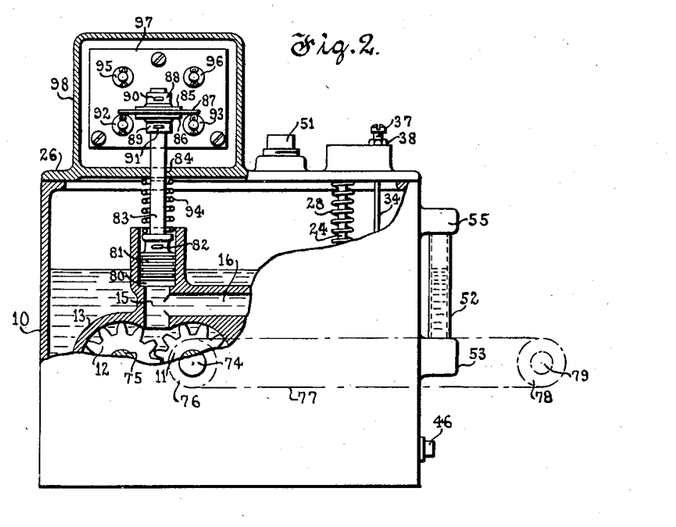
Fig. 2 is a view partly in vertical section illustrating a device like that disclosed in Fig. 1, but having a modified form of pressure responsive switch.

The pump gears 11 and 12 are carried on shafts 74 and 75 having suitably packed bearings within the receptacle 10 and the pump chamber 13, and as shown in Fig. 2 shaft 74 extends through the wall of said receptacle and on said extension is mounted a pulley 76 having belt connection 77 with a pulley 78 keyed to the shaft 79 of a motor to be controlled, or if desired pulley 78 may be driven by shaft 79 through intermediate gearing.

Referring more particularly to the device disclosed in Fig. 2, the same is substantially like that shown in Fig. 1, but in Fig. 2 I provide a modified form of pressure responsive switch operating means. In this arrangement the conduit 15 extends upwardly into communication with a cylindrical chamber 80 adapted to receive a piston 81. Attached to said piston in a suitable manner, as by cotter pin 82, is a rod 83 extending upwardly through an opening 84 in the cover 26. At the upper end of said rod and insulated therefrom by insulating bushings 85 and 86 is a conducting disk or plate 87, said bushings being held or clamped between collars 88 and 89 fixed to rod 84 by cotter pins 90 and 91.

Disk 87 is normally adapted to engage a pair of down contacts 92 and 93, being biased to such position by a spring 94 interposed between the cover 26 and piston 81. Under predetermined pressure conditions piston 81 is forced upwardly against the action of spring 94 to move disk 87 out of engagement with contacts 92 and 93 and into engagement with contacts 95 and 96. Contacts 92, 93, 95 and 96 are supported upon a suitable insulating panel 97 within a protective casing 98 formed upon the cover 26, said casing being provided with a suitable door or opening, not shown, to permit access to the interior thereof.

Figure 3:
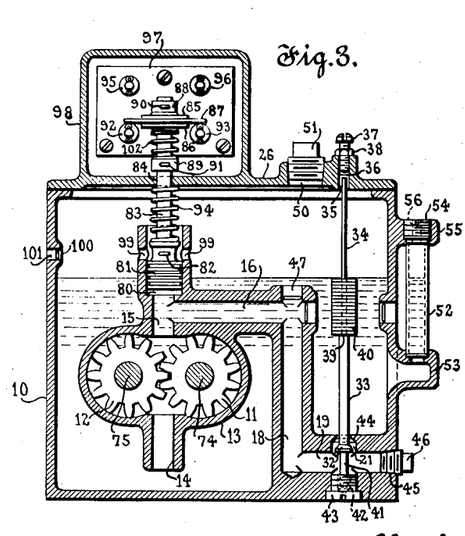
Fig. 3 illustrates a modified form of the device disclosed in Fig. 2.

In the device illustrated in Fig. 3 the cylinder 80 is provided with a plurality of ports 99 through the walls thereof, which ports may be drilled from the outside of casting 10 through opening 100 which is thereafter closed by a suitable plug 101. When the piston 81 is driven upwardly by the fluid pressure the bottom of the piston will uncover the ports 99 which serve as a relief valve, and as the pressure increases or decreases the piston will rise or fall slightly uncovering more or less of the ports 99, the spring 102 interposed between collar 89 and bushing 86 permitting this slight vertical motion of piston 81 and rod 83, while disk 87 is kept in engagement with up contacts 95 and 96. By this arrangement the necessity for a relief valve, as shown at 22, Fig. 1, is obviated.

Figure 4:
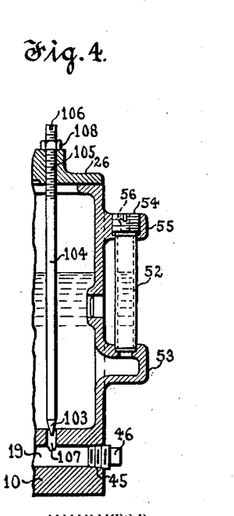
Fig. 4 is a fragmentary sectional view of a further modified form of the device constructed in accordance with my invention.

The devices thus far described provide for acceleration control as well as for dynamic braking by reversing the torque of the motor to stop the same without reversing the rotation thereof, whereas the modification shown in Fig. 4 may be employed where acceleration control of the motor is not necessary or desired. In the device of Fig. 4 an adjustable needle valve 103 is substituted for the check valve 32 shown in the other figures. The stem 104 of said valve is screw-threaded as indicated at 105 for engagement with a threaded opening in cover 26, means 106 being provided for adjusting said valve to regulate the size of orifice 107 and a nut 108 being adapted to lock said valve in adjusted position.

For circulation within receptacle 10 I preferably use a thin lubricating oil or other substantially incompressible fluid having slight change of viscosity under conditions of variation in temperature. In assembling a device like that shown in Fig. 1 the Bourdon tube 17 is filled with oil, plug 51 in cover 26 is removed and the necessary quantity of oil introduced into the receptacle. Plug 49 is unscrewed sufficiently to provide for a slight leakage, and the pump is then operated for a short time to expel all air from the conduits below the level of liquid in the receptacle 10, after which plug 49 is screwed into place to prevent leakage. Expulsion of air from the several conduits in the other figures is similarly effected by operation of the pump for a short interval.

Figure 5:
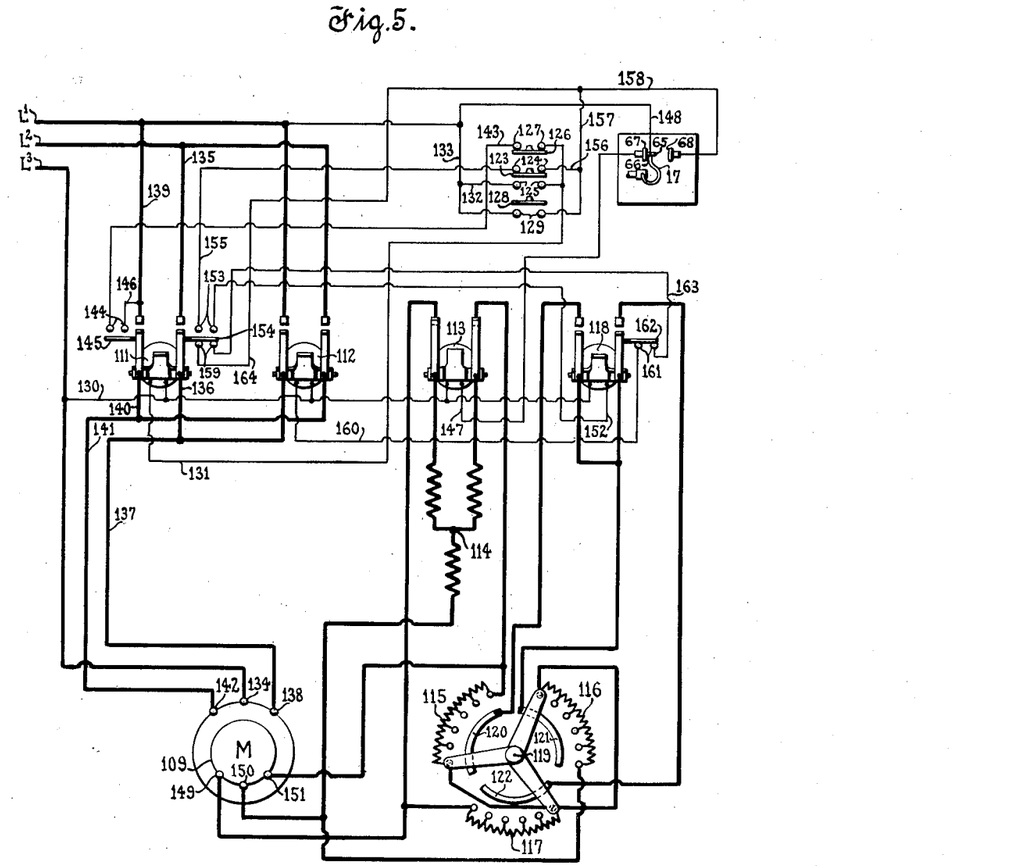
Fig. 5 illustrates diagrammatically one application of my invention to the control of an electric motor.

In Fig. 5 I have illustrated diagrammatically one of the forms of electric controller which may be employed in conjunction with my improved fluid pressure relay control system. In this figure M indicates a three-phase slip-ring motor to be supplied with current from lines $L^1$, $L^2$ and $L^3$ through a pair of double-pole reversing switches 111 and 112. 113 is a double-pole switch for connecting resistance 114 in parallel with resistance sections 115, 116 and 117 to thus provide sufficient inrush current to positively start the motor with excess torque; whereas the double-pole switch 118 is adapted to connect the rotor 109 to the running resistance 115, 116 and 117 through the adjustable three-arm contactor 119 and sectors 120, 121 and 122.

The push-button control station comprises a start button 123 having normally closed contacts 124 and normally open contacts 125. The stop button 126 is provided with normally closed contacts 127, whereas the reversing inch button 128 is provided with normally open contacts 129. One form of my improved pressure responsive relay is shown diagrammatically at the upper right hand side of Fig. 5.

I will now describe the operation of the device as illustrated in Figs. 1 and 5. To start the motor, start button 123 is depressed, thus energizing the winding of switch 111. The energizing circuit may be traced from line $L^3$, by conductor 130 through said winding, by conductor 131 through the down contacts 125 of push-button 123, and by conductors 132 and 133 to line $L^1$. Upon closure of switch 111 the motor circuit extends from line $L^3$ to terminal 134; from line $L^2$, by conductor 135 through the right-hand pole of switch 111, by conductors 136 and 137 to terminal 138; and from line $L^1$ by conductor 139 through the left-hand pole of switch 111, by conductors 140 and 141 to terminal 142. A maintaining circuit for switch 111 extends from line $L^3$ by conductor 130 through said winding, by conductor 131 through normally closed push-button contacts 126 and 127, by conductor 143 through auxiliary contacts 144 and 145, and by conductors 146 and 139 to line $L^1$.

Switch 113 is normally closed, the energizing circuit therefor extending from line $L^3$, by conductor 130 through the winding thereof, by conductor 147 through normally closed contacts 67 and 66 of the pressure responsive relay, and by conductor 148 to line $L^1$. Terminals 149, 150 and 151 are thus connected through resistance 114 in parallel with resistance sections 115, 116 and 117 to provide excess torque in starting. The pump being driven by the motor at a speed proportional to the latter causes circulation of the fluid from the supply in receptacle 10 through nozzle 14 and conduits 16, 18 and 19, said fluid discharging into receptacle 10 through the annular orifice between the walls of opening 21 and check valve 32, said parts forming a restrictor and thus offering resistance to passage of the fluid in proportion to the volume of the flow. When the motor has reached a predetermined speed, say about one-third speed, the pressure in conduit 19 will be sufficient to quickly raise check valve 32 until the top of valve stem 34 engages adjusting screw 37, not allowing the check valve to close entirely and thereby leaving an adjusted passage for the flow of a small volume of fluid. Since valve 32 is thus nearly closed a large increase in pressure within the conduits 16, 18 and 19 will instantly occur, which pressure will be transmitted to the Bourdon tube 17 to thereby effect rapid disengagement of contact point 66 from stationary contact 67 and engagement of contact point 65 with stationary contact 68. Switch 113 is thus deenergized and opens to disconnect resistance 114 from the rotor 109, switch 118 being simultaneously closed to connect the rotor through sectors 120, 121 and 122 to the three-arm contactor 119 to provide a running speed for the motor as determined by the position of the adjustable contactor 119. The energizing circuit for switch 118 may be traced from line $L^3$, by conductor 130, through the winding thereof, by conductor 152 through auxiliary contacts 153 and 154 on switch 111, by conductor 155 through the up contacts 124 of push button 123, by conductors 156, 157 and 158, through contacts 68 and 65, and by conductor 148 to line $L^1$.

The normally open push-button 128 is employed for inching or jogging the motor backwards when necessary or desirable. Push-button 126 when pressed in and latched provides for inching by means of push-button 123, since under such conditions button 123 when pressed down onto contacts 125 will energize the winding of switch 111 only so long as it is pressed in.

It will be seen that the means thus far described provides for positive acceleration control of the motor, the latter being connected to the adjusted running resistance at a certain critical speed of the pump driven by the motor. I also provide means for plugging the motor for quick stopping by reversing the phases with reference to each other, so that when the motor has come to rest it will be automatically disconnected from the line so as to prevent reversal of the same.

Assuming the motor to have been brought to speed, to stop the same push-button 126 is depressed, thereby interrupting the maintaining circuit for switch 111. Switch 111 in opening disengages the auxiliary contacts 153 and 154 thereof to interrupt the energizing circuit of switch 118, which opens to disconnect arm 119 from the running resistance, leaving all of the resistance 115, 116 and 117 connected to the slip-rings of the motor. In opening, switch 111 effects engagement of auxiliary contacts 154 and 159, thereby closing the energizing circuit of switch 112, which circuit may be traced from line $L^3$ by conductor 130, through the winding of switch 112, by conductor 160 through auxiliary contacts 161 and 162 on switch 118, by conductor 163 through auxiliary contacts 159 and 154 of switch 111, by conductors 164 and 158, through contacts 68 and 65, and by conductor 148 to line $L^1$. A reverse torque will result from the aforementioned reversal of the motor circuit, and the motor will decelerate rapidly.

Because of the lag or lapse of time from the instant the circuit to the winding of switch 112 is broken until the switch is actually opened, it is desirable to provide means to control the pressure in conduit 19 and the pressure responsive switch operating means so that contact 65 will separate from contact 68 in advance of the motor coming to rest a sufficient length of time to cover the switch lag. This time lag in the switch opening is provided for by unseating check valve 32 more or less by the adjusting screw 37, so that just before the motor stops, all of the fluid pumped can escape through the orifice around the unseated check valve 32 when the pressure will drop off quickly with the decreasing speed. By adjusting the screw 37 this unseating of the check valve can be controlled to a nicety so that the reversing switch 112 will open at the critical point to prevent reverse rotation of the motor. On the other hand, if the orifice around valve 32 were too large switch 112 would be caused to open too soon as the motor would tend to coast, whereas if the orifice were to small said switch would remain closed too long, resulting in reversal of the motor.

If it is desired to operate the pump at a higher proportional speed additional weights 40 are placed upon valve stem 34, so that check valve 32 will pick up at a higher speed and greater flow of the fluid, whereas if it is desired to have valve 32 pick up at a lower speed some of the weights 40 may be removed.

The modifications illustrated in Figs. 2 and 3 are substantially like that of Fig. 1 in function and mode of operation. As the speed of the pumps in Figs. 2 and 3 increases more fluid is circulated than is able to escape through the annular orifice around check valve 32, hence the fluid pressure in conduit 19 increases and at the critical point predetermined by the adjustable weights 40, as aforedescribed, the valve 32 is carried upwardly toward its seat by the fluid pressure, whereupon a large increase in pressure instantly occurs in the conduits communicating with the discharge side of the pump. Piston 81 is therefore quickly driven upward, causing disk 87 to move out of engagement with contacts 92 and 93 to deenergize resistance switch 113 (Fig. 5) and into engagement with contacts 95 and 96 to energize adjusted running resistance switch 118, auxiliary contacts 153 and 154 of switch 111 being then in engagement. Down contact 92 and up contact 95 are electrically connected to correspond with the double acting contact 65 (Figs. 1 and 5) and contacts 93 and 96 correspond with contacts 67 and 68, respectively, in said figures. The spring 28 in Fig. 2 is calibrated to permit relief valve 22 to open upon the development of pressure in excess of that required to maintain disk 87 in engagement with contacts 95 and 96.

Figure 6:
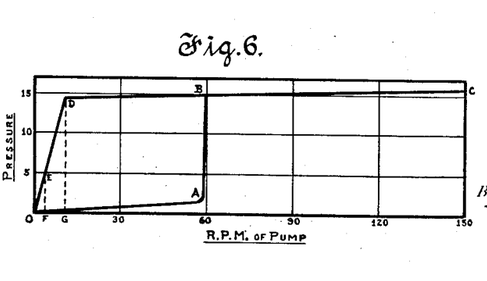
Fig. 6 is a curve diagram illustrating certain operative characteristics of the pressure responsive relays in Figs. 1 to 5.

Referring now to Fig. 6, the curve OABC illustrates the variations in fluid pressure in the relay as related to variations in the speed at which the pump is driven during starting and acceleration of the motor. Thus, with the fluid pressure and speed of the pump at zero as indicated at 0, upon starting the motor and consequently the pump, the pressure developed gradually increases until it is sufficient, as indicated at point A, to lift and substantially close check valve 32 (Figs. 1 to 3) whereupon the pressure instantly increases to a large extent, as indicated by curve AB, resulting in operation of the pressure responsive switch to change from starting to running connections for the motor. At point B the relief valve is adapted to open, wherefor the pressure will increase only slightly up to the full speed of the motor, as indicated by curve BC. The curve CDO indicates the relation between the speed of the pump and the fluid pressure after initiating the stopping operation including plugging of the motor. As indicated by curve CD the fluid pressure gradually decreases, until at the point D the relief valve is adapted to close, DGO indicating the relatively high degree of pressure at a low speed of the pump. The fluid pressure thereupon rapidly decreases, as indicated by curve DE, and at point E the pressure responsive switch is adapted to open for deenergizing the reverse torque switch 112 (Fig. 5), the time required for the pump to decrease from speed F to zero speed being equal to the time lag of the switch 112, whereby said switch actually opens at the instant the pump and motor come to a dead stop, thus preventing reversal of the motor. On the other hand, curve ODC indicates the relative speed and pressure characteristics of a device constructed as illustrated in Fig. 4, in which the motor is started without acceleration control; and the same relative speed and pressure characteristics obtain, but in a reverse order (that is, the curve CDO) after the stopping operation is initiated.

Although attempts have heretofore been made to provide means for controlling a reversing switch to permit of reverse torque for plugging of the motor without reversing the latter, such as by employing a centrifugal governor, a paddle or a cam deflected by a fluid under pressure, nevertheless such devices have not been sufficiently positive in their operation, nor capable of close adjustment. In such devices, therefore, the reverse torque switch is liable to be released before the motor is brought to rest, and consequently the machine driven thereby will coast for an appreciable time, or an actual reversal of the motor may take place, with objectionable results in either event. According to my invention, however, the contacts of the pressure responsive switch are maintained in engagement until a critical point is reached in the deceleration and then opened quickly. The advantages of the present device result from the simplicity and accurate adjustability of the several parts thereof, whereas the employment of a substantially incompressible fluid as aforementioned renders the device additionally positive and accurate in its operation.

While I have shown herein a Bourdon tube and a piston and cylinder operating means for the pressure responsive switch, it will be apparent to those skilled in the art that any suitable form of expansive chamber may be employed, such, for example, as a metal bellows or the like. Similarly, it is to be understood that my invention is adapted to the control of various types of motors, Fig. 5 merely illustrating one form which the control system may assume in practice.

My invention also comprehends the ultilization of the pressure variations aforedescribed for controlling auxiliary devices associated with a particular control installation. Thus, by substituting a union for the plug 46 in the several figures, the conduit 19 may communicate through suitable piping with pressure responsive means to control the operation of brakes, clutches, valves and the like in synchronism with the control of the motor.

What I claim as new and desire to secure by Letters Patent is:

1. In a control system, in combination, an electric motor, a positive displacement pump driven thereby, a conduit to receive a stream of liquid impelled by said pump, a normally open check valve controlling the escape of liquid from said conduit, said valve being adapted to automatically close upon the development of a predetermined pressure in said conduit to thereby effect a sudden large increase in pressure of said liquid, and a pressure operated switch responsive to said increase in pressure for commutating the circuit of said motor.

2. A controller for an electric motor, comprising a switch for controlling the motor, a fluid motor for operating the same, a fluid pump for creating pressure to operate said fluid motor, and means operated by said pressure at a critical motor speed to increase said pressure and thereby operate said motor and to keep said pressure sufficient to operate said motor until the speed is lower than said critical motor speed.

3. A controller for an electric motor, comprising a switch for controlling the motor, a fluid motor for operating the same, a fluid pump for creating pressure to operate said fluid motor, means operated by said pressure at a critical motor speed to increase said pressure and thereby operate said motor and to keep said pressure sufficient to operate said motor until the speed is lower than said critical motor speed, and means controlled by said switch for controlling the electric motor.

4. A controller for an electric motor, comprising a switch for controlling the motor, a fluid motor for operating the same, a fluid pump for creating pressure to operate said fluid motor, means operated by said pressure at a critical motor speed to increase said pressure and thereby operate said motor and to keep said pressure sufficient to operate said motor until the speed is lower than said critical motor speed, and means controlled by said switch for causing the electric motor to have a reverse torque in being stopped.

5. A controller for an electric motor, comprising a switch, a fluid motor for operating the same, a fluid pump for creating a pressure to operate said motor, and a valve controlled by said pressure to increase said pressure at a critical motor speed and thereby operate said motor and to keep said pressure sufficient to operate said motor until the speed is lower than said critical motor speed.

6. A controller for an electric motor, comprising a switch, a fluid motor for operating the same, a fluid pump for creating a pressure to operate said motor, a valve controlled by said pressure to increase said pressure at a critical motor speed and thereby operate said motor and to keep said pressure sufficient to operate said motor until the speed is lower than said critical motor speed, and means controlled by said switch to cause the electric motor to have a reverse torque in being stopped.

7. A controller for an electric motor, comprising a switch, a fluid motor for operating the same, a positive displacement fluid pump for creating a pressure to operate said motor, and a valve controlled by said pressure to increase said pressure at a critical motor speed and thereby operate said motor and to keep said pressure sufficient to operate said motor until the speed is lower than said critical motor speed.

8. A controller for an electric motor, comprising a switch, a fluid motor for operating the same, a positive displacement fluid pump for creating a pressure to operate said motor, a valve controlled by said pressure to increase said pressure at a critical motor speed and thereby operate said motor and to keep said pressure sufficient to operate said motor until the speed is lower than said critical motor speed, and means controlled by said switch to cause the electric motor to have a reverse torque in being stopped.

9. A controller for an electric motor, comprising a switch, means controlled by said switch for causing the electric motor to have a reverse torque in being stopped, a fluid motor for operating said switch, a fluid pump driven in accordance with the motor speed to create pressure for operating said fluid motor, and means to allow the fluid to circulate and limit the pressure after said fluid motor has been operated.

10. A controller for an electric motor, comprising a switch, means controlled by said switch for causing the electric motor to have a reverse torque in being stopped, a fluid motor for operating said switch, a positive displacement fluid pump driven in accordance with the motor speed to create pressure for operating said fluid motor, and means to allow the fluid to circulate and limit the pressure after said fluid motor has been operated.

11. An electric motor controller comprising a fluid pump producing a fluid pressure in accordance with the motor speed, means to cause the motor to have a reversed torque in being stopped, and means operated by said fluid pressure to cause the aforesaid means to maintain said reverse torque until the motor stops.

12. An electric motor controller comprising a positive displacement pump to produce fluid pressure in accordance with the motor speed, means operated by said fluid pressure to cause the motor to have a reverse torque in being stopped, and means to cause said reverse torque to be maintained until the motor is about stopped.

13. An electric motor controller comprising a fluid pump to create positive displacement pressure in accordance with the motor speed, a fluid motor operated by said fluid pressure, means controlled by said fluid motor to cause the electric motor to have a reverse torque in being stopped, and means controlled by said fluid pressure to cause said reverse torque to be maintained until the electric motor is about stopped.

14. An electric motor controller comprising a fluid pump to create fluid pressure in accordance with the motor speed, a fluid motor operated by said fluid pressure, means set by said fluid motor to cause the electric motor to have a reverse torque in being stopped, and a valve controlled by said fluid pressure to cause said reverse torque to be maintained until the electric motor is about stopped.

15. An electric motor controller comprising a fluid pump to create fluid pressure in accordance with the motor speed, a fluid motor operated by said fluid pressure, an electric switch operated by a spring controlled by said fluid motor, means controlled by said switch to cause the electric motor to maintain a reverse torque in being stopped, and a valve controlled by said fluid pressure to cause sufficient fluid pressure to be maintained to keep said switch operated until the electric motor is about stopped.

16. An electric motor controller comprising a fluid pressure pump to produce a fluid pressure in accordance with the motor speed, a cylinder having fluid pressure supplied thereto by said pump, a piston operated by said fluid pressure and controlling an escape port to limit the pressure thereon, an electric switch operated by said piston, and means controlled by said switch to control an electric motor.

17. An electric motor controller comprising a fluid pressure pump to produce a fluid pressure in accordance with the motor speed, a cylinder having fluid pressure supplied thereto by said pump, a piston operated by said fluid pressure and controlling an escape port to limit the pressure thereon, an electric switch operated by said piston, a spring acting upon said piston in opposition to said fluid pressure, and means controlled by said switch to control an electric motor.

18. An electric motor controller comprising a fluid pressure pump to produce a fluid pressure in accordance with the motor speed, a cylinder having fluid pressure supplied thereto by said pump, a piston operated by said fluid pressure and controlling an escape port to limit the pressure thereon, an electric switch operated by said piston, a spring arranged between said switch and piston to allow said piston to advance relatively to said switch, and means controlled by said switch to control an electric motor.

19. An electric motor controller comprising a fluid pressure pump to produce a fluid pressure in accordance with the motor speed, a cylinder having fluid pressure supplied thereto by said pump, a piston operated by said fluid pressure and controlling an escape port to limit the pressure thereon, means acting at a predetermined fluid pressure to cause a sudden increase in the pressure applied to said piston, an electric switch operated by said piston, and means controlled by said switch to control an electric motor.

20. An electric motor controller comprising a fluid pressure pump to produce a fluid pressure in accordance with the motor speed, a cylinder having fluid pressure supplied thereto by said pump, a piston operated by said fluid pressure and controlling an escape port to limit the pressure thereon, means acting at a predetermined fluid pressure to cause a sudden increase in the pressure applied to said piston, an electric switch operated by said piston, a spring acting upon said piston in opposition to said fluid pressure, and means controlled by said switch to control an electric motor.

21. An electric motor controller comprising a fluid pressure pump to produce a fluid pressure in accordance with the motor speed, a cylinder having fluid pressure supplied thereto by said pump, a piston operated by said fluid pressure and controlling an escape port to limit the pressure thereon, means acting at a predetermined fluid pressure to cause a sudden increase in the pressure applied to said piston, an electric switch operated by said piston, a spring arranged between said switch and piston to allow said piston to advance relatively to said switch, and means controlled by said switch to control an electric motor.

22. An electric motor controller comprising a fluid pump driven in accordance with the motor speed, a cylinder having fluid under pressure supplied thereto by said pump, a piston operated by the fluid pressure in said cylinder and controlling an outlet port to limit the pressure applied to said piston, an electric switch operated by said piston, and means controlled by said switch to cause said motor to have a reverse torque in being stopped.

23. An electric motor controller comprising a fluid pump driven in accordance with the motor speed, cylinder having fluid under pressure supplied thereto by said pump, a piston operated by the fluid pressure in said cylinder and controlling an outlet port to limit the pressure applied to said piston, a spring acting upon said piston in opposition to said fluid pressure, an electric switch operated by said piston, and means controlled by said switch to cause said motor to have a reverse torque in being stopped.

24. An electric motor controller comprising a fluid pump driven in accordance with the motor speed, cylinder having fluid under pressure supplied thereto by said pump, a piston operated by the fluid pressure in said cylinder and controlling an outlet port to limit the pressure applied to said piston, an electric switch operated by said piston, a spring interposed between the switch and said piston, and means controlled by said switch to cause said motor to have a reverse torque in being stopped.

In witness whereof, I have hereunto subscribed my name.

CHARLES E. CARPENTER.

CERTIFICATE OF CORRECTION.

Patent No. 1,871,112.                                                August 9, 1932.

CHARLES E. CARPENTER.

It is hereby certified that error appears in the printed specification of the above numbered patent requiring correction as follows: Page 4, line 69, for the word "to" read too; page 6, line 72, claim 13, for "fluid" read positive displacement; line 72-73, same claim, for "positive displacement" read fluid; page 7, lines 60 and 72, claims 23 and 24 respectively, before "cylinder" insert a; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.